United States Patent Office 2,798,043
Patented July 2, 1957

2,798,043
TREATMENT OF DRILLING SLUDGE

Martin Meister, Leverkusen, Bruno Zorn, Koln-Deutz, and Gustav Mauthe, Opladen, Germany, assignors to Farbenfabriken Bayer Aktiengesellschaft, Leverkusen, Germany, a corporation of Germany No Drawing. Application March 15, 1955,
Serial No. 494,536

Claims priority, application Germany March 24, 1954

1 Claim. (Cl. 252—8.5)

This invention relates to the treatment of drilling sludge.

For influencing the physical properties of drilling sludges, for example in petroleum and natural gas wells, it is known to add preponderantly alkaline solutions of quebracho to the said sludges for reducing their viscosity and gelling power and also for improving their resistance to salt water. In addition, this additive has a high degree of thermal stability, which also permits of it being used when relatively high temperatures affect the drilling sludge, such as occur, for example, with deep drilling wells.

Whereas quebracho is used in very large quantities for this purpose, other natural tanning substances, such as, for example, chestnut wood extract, have so far not proved satisfactory. Moreover, it has been shown that commercially available synthetic tanning substances the tanning action of which is absolutely comparable with that of quebracho do not show the specific effect of the said quebracho on drilling sludge.

It is an object of the present invention to provide a process for improving the properties of drilling sludges.

It is especially an object of the present invention to provide a process for lowering the gelling power, for reducing the viscosities and for improving the resistance to salt of drilling sludges.

Further objects will become apparent as the following description proceeds.

In accordance with the present invention it has now surprisingly been found that alkaline solutions of the wholly or partially demethylated products which are formed by the degradation of lignitic substances by fusion with alkali are able to influence the properties of drilling sludges just as well as alkaline solutions of quebracho.

By treating drilling sludges, for example for use in petroleum and natural gas well with an alkaline solution of a wholly or partially demethylated lignin degradation substance prepared by the fusion of lignite substances with alkali the viscosity and gelling power of the drilling sludge are lowered and its resistance to salt is improved.

Examples of lignin substances which are suitable as starting materials for fusion with alkali are: wood, acid lignins, lignin-sulphonic acids, sulphite cellulose waste liquors, nitrolignins and chlorolignins. The degradation products of lignin substances which can be used for the process of the present invention can, for example, be produced by the processes disclosed in German Patents Nos. 740,269 and 753,346 and French Patents Nos. 878,122 and 878,451. The substances which are formed by working up the melts, that is to say both the sparingly water-soluble amorphous substances which readily dissolve in water containing alkalies, and also those low molecular weight portions which are soluble in water having an acid reaction, show the required specific action on the viscosity, compatibility with salt water and gelling power of the drilling sludges. Alkali melts of lignin and sulphite cellulose waste liquors, which have been reacted with a small amount of alkali in such manner that uslphonic groups have split off and there has been a more or less complete demethylation and a reduction in molecular weight, can be used for treating drilling sludges without further working up, provided that not too great an excess of alkali is present.

It has further been found that the degradation products produced from lignitic substances by means of alkali are more effective as drilling sludge additives in proportion as they contain less methoxy, that is to say, in proportion as more pyrocatechol and pyrogallol units formed are from the guaiacyl units contained in the lignin. By alkali treatment at temperatures between 200 and 350° C., preferably in the region of 250° C., it is possible to obtain such products with a suitable amount of alkali and a suitable reaction time. The details of the manner in which this alkali treatment is carried out can be modified in various ways. These degradation products of lignin and of sulphite cellulose waste liquors, for example those produced by the processes disclosed in German Patent No. 740,269 and French Patents Nos. 878,122 and 878,451, are at the same time tanning substances, in the same way as the quebracho used as an additive for drilling sludges.

The following examples further illustrate the invention but do not limit same in any way:

Example 1

4 kg. of sodium lignin sulphonate and 5 kg. of sodium hydroxide are melted together for one hour at about 270° C. while stirring. The melt is dissolved in water and acidified, the amorphous product which precipitates is dried and its efficacy on drilling sludge is investigated. The results obtained are shown in column 1 of the accompanying table.

Example 2

11.25 kg. of sulphite waste liquor (6 kg. dry content) are heated with 6 kg. of sodium hydroxide for 1 hour at 260–290° C. The temperature is usually higher than 270° C. The melt (2a) is split by acidification into a sparingly soluble part (2b) and, by extraction of the residual acid solution with ethyl acetate or other suitable organic solvent, a readily soluble part (2c). The efficacy of the aqueous solution of the melt (2a) and the sparingly soluble part (2b) and the readily soluble part (2c) thereof were investigated; the results are set out in the following table.

[Comparison substance: Quebracho (3) and alkali sulphite waste liquor (4).]

| Viscosity (in g. Stormer) of the drilling sludge | 1 | 2a+ | 2b++ | 2c | 3 | 4+ |
|---|---|---|---|---|---|---|
| without addition | 56.0 | 58.0 | 58.0 | 58.0 | 54.0 | 58.0 |
| 0.05% addition | 51.5 | 57.0 | 57.0 | 57.0 | 54.0 | 60.0 |
| 0.1% addition | 49.0 | 55.0 | 55.0 | 53.0 | 53.0 | 60.0 |
| 0.2% addition | 48.0 | 54.0 | 53.0 | 52.0 | 52.0 | 58.0 |
| 0 min. gelling power: | | | | | | |
| without addition | 15.0 | 17.0 | 17.0 | 17.0 | 15.5 | 17.0 |
| 0.05% addition | 5.0 | 6.0 | 8.5 | 8.0 | 8.0 | 15.5 |
| 0.1% addition | 4.0 | 5.0 | 6.0 | 6.0 | 6.5 | 16.0 |
| 0.2% addition | 4.0 | 4.5 | 5.0 | 5.5 | 5.5 | 16.0 |
| 10 min. gelling power: | | | | | | |
| without addition | 45.0 | 58.0 | 53.0 | 53.0 | 50.0 | 58.0 |
| 0.05% addition | 19.5 | 30.0 | 24.0 | 24.5 | 24.0 | 56.0 |
| 0.1% addition | 18.0 | 23.0 | 17.5 | 17.0 | 18.0 | 55.0 |
| 0.2% addition | 8.5 | 15.5 | 13.0 | 14.5 | 13.0 | 45.0 |

(+) The salt content of the melt was taken into account.
(++) The sulphite waste liquor was adjusted to the same pH value as the solutions of tanning substance.

We claim:

An aqueous drilling mud containing a material obtained by fusing lignite with alkali, dissolving the melt in water, and acidifying the resulting solution in a proportion sufficient to reduce the viscosity and gel strength of the mud.

References Cited in the file of this patent

UNITED STATES PATENTS

| | | |
|---|---|---|
| 2,620,300 | Given | Dec. 2, 1952 |
| 2,674,575 | Lewis et al. | Apr. 6, 1954 |